(12) United States Patent
Rayev

(10) Patent No.: US 12,235,806 B2
(45) Date of Patent: Feb. 25, 2025

(54) SYSTEM AND METHOD FOR DISTRIBUTED DATA CONSOLIDATION

(71) Applicant: EMC IP Holding Company, LLC, Hopkinton, MA (US)

(72) Inventor: Alexander Rayev, Hopedale, MA (US)

(73) Assignee: EMC IP Holding Company, LLC, Hopkinton, MA (US)

(*) Notice: Subject to any disclaimer, the term of this patent is extended or adjusted under 35 U.S.C. 154(b) by 259 days.

(21) Appl. No.: 17/506,799

(22) Filed: Oct. 21, 2021

(65) Prior Publication Data
US 2023/0128035 A1    Apr. 27, 2023

(51) Int. Cl.
*G06F 16/182* (2019.01)
*G06F 16/27* (2019.01)

(52) U.S. Cl.
CPC .............. *G06F 16/1824* (2019.01)

(58) Field of Classification Search
CPC .............. G06F 16/182–183; G06F 16/27
USPC ................................................ 707/827
See application file for complete search history.

(56) References Cited

U.S. PATENT DOCUMENTS

| | | | |
|---|---|---|---|
| 9,519,441 B1 * | 12/2016 | Smith | G06F 3/0605 |
| 10,387,262 B1 * | 8/2019 | Chikkanayakanahally | G06F 16/256 |
| 10,614,047 B1 * | 4/2020 | Acharya | G06F 16/27 |
| 10,911,536 B2 * | 2/2021 | Gumerato | H04L 67/1095 |
| 11,151,032 B1 * | 10/2021 | Kim | G06F 16/9574 |
| 2004/0068516 A1 * | 4/2004 | Lee | G06F 16/182 |
| 2006/0173850 A1 * | 8/2006 | Auer | G06F 16/273 |
| 2007/0100834 A1 * | 5/2007 | Landry | G06F 16/275 |
| 2017/0235808 A1 * | 8/2017 | Salame | H04L 67/1095 707/625 |
| 2018/0322599 A1 * | 11/2018 | Srivastava | H04L 67/141 |
| 2019/0068387 A1 * | 2/2019 | Nandy | H04L 12/18 |
| 2019/0129628 A1 * | 5/2019 | Wu | G06F 3/0619 |
| 2022/0121623 A1 * | 4/2022 | Lyske | G06F 9/52 |

* cited by examiner

*Primary Examiner* — Kuen S Lu
(74) *Attorney, Agent, or Firm* — Brian J. Colandreo; Heath M. Sargeant; Holland & Knight LLP (57) ABSTRACT

A method, computer program product, and computing system for deploying an agent configured to communicate with a centralized database and a plurality of remote databases. The plurality of remote databases may be polled, via the agent, for data for storage in the centralized database. The data may be consolidated from the plurality of remote databases to the centralized database.

15 Claims, 5 Drawing Sheets

SYSTEM AND METHOD FOR DISTRIBUTED DATA CONSOLIDATION

BACKGROUND

Storing and safeguarding electronic content may be beneficial in modern business and elsewhere. Accordingly, various methodologies may be employed to protect and distribute such electronic content.

Many storage systems utilize a cluster-based configuration for coupling multiple storage appliances where data on one storage appliance is accessible via any of the storage appliances. However, these configurations generally include a primary storage appliance that is configured to process the majority of, if not all, external input/output (IO) commands on the storage system. Accordingly, when data is distributed across the cluster-based configuration, processing IO commands associated with the distributed data may introduce processing delays. Additionally, conventional remote data collection and local data processing performance heavily depends on the current processing loads for each storage appliance and introduces challenges for parallel processing.

SUMMARY OF DISCLOSURE

In one example implementation, a computer-implemented method executed on a computing device may include, but is not limited to, deploying an agent configured to communicate with a centralized database and a plurality of remote databases. The plurality of remote databases may be polled, via the agent, for data for storage in the centralized database. The data may be consolidated from the plurality of remote databases to the centralized database.

One or more of the following example features may be included. The centralized database may be located on a first storage appliance. The plurality of remote databases are located on a plurality of storage appliances communicatively coupled to the first storage appliance. Polling, via the agent, the plurality of remote databases for data for storage in the centralized database may include at least one of: polling, via the agent, the plurality of remote databases for data for storage in the centralized database based upon, at least in part, a polling schedule; and polling, via the agent, the plurality of remote databases for data for storage in the centralized database in response to receiving a polling request from the centralized database. Polling, via the agent, the plurality of remote databases for data for storage in the centralized database may include validating one or more data entries of the centralized database, wherein the one or more data entries are associated with data stored in the plurality of remote databases. Consolidating, via the agent, the data from the plurality of remote databases to the centralized database may include storing the data from the plurality of remote databases in a common data structure of the centralized database. Consolidating, via the agent, the data from the plurality of remote databases to the centralized database may include processing the data from the plurality of remote databases to the centralized database in parallel.

In another example implementation, a computer program product resides on a computer readable medium that has a plurality of instructions stored on it. When executed by a processor, the instructions cause the processor to perform operations that may include, but are not limited to, deploying an agent configured to communicate with a centralized database and a plurality of remote databases. The plurality of remote databases may be polled, via the agent, for data for storage in the centralized database. The data may be consolidated from the plurality of remote databases to the centralized database.

One or more of the following example features may be included. The centralized database may be located on a first storage appliance. The plurality of remote databases are located on a plurality of storage appliances communicatively coupled to the first storage appliance. Polling, via the agent, the plurality of remote databases for data for storage in the centralized database may include at least one of: polling, via the agent, the plurality of remote databases for data for storage in the centralized database based upon, at least in part, a polling schedule; and polling, via the agent, the plurality of remote databases for data for storage in the centralized database in response to receiving a polling request from the centralized database. Polling, via the agent, the plurality of remote databases for data for storage in the centralized database may include validating one or more data entries of the centralized database, wherein the one or more data entries are associated with data stored in the plurality of remote databases. Consolidating, via the agent, the data from the plurality of remote databases to the centralized database may include storing the data from the plurality of remote databases in a common data structure of the centralized database. Consolidating, via the agent, the data from the plurality of remote databases to the centralized database may include processing the data from the plurality of remote databases to the centralized database in parallel.

In another example implementation, a computing system includes at least one processor and at least one memory architecture coupled with the at least one processor, wherein the at least one processor is configured to deploy an agent configured to communicate with a centralized database and a plurality of remote databases. The at least one processor may be further configured to poll, via the agent, the plurality of remote databases for data for storage in the centralized database. The at least one processor may be further configured to consolidate, via the agent, the data from the plurality of remote databases to the centralized database.

One or more of the following example features may be included. The centralized database may be located on a first storage appliance. The plurality of remote databases are located on a plurality of storage appliances communicatively coupled to the first storage appliance. Polling, via the agent, the plurality of remote databases for data for storage in the centralized database may include at least one of: polling, via the agent, the plurality of remote databases for data for storage in the centralized database based upon, at least in part, a polling schedule; and polling, via the agent, the plurality of remote databases for data for storage in the centralized database in response to receiving a polling request from the centralized database. Polling, via the agent, the plurality of remote databases for data for storage in the centralized database may include validating one or more data entries of the centralized database, wherein the one or more data entries are associated with data stored in the plurality of remote databases. Consolidating, via the agent, the data from the plurality of remote databases to the centralized database may include storing the data from the plurality of remote databases in a common data structure of the centralized database. Consolidating, via the agent, the data from the plurality of remote databases to the centralized database may include processing the data from the plurality of remote databases to the centralized database in parallel.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
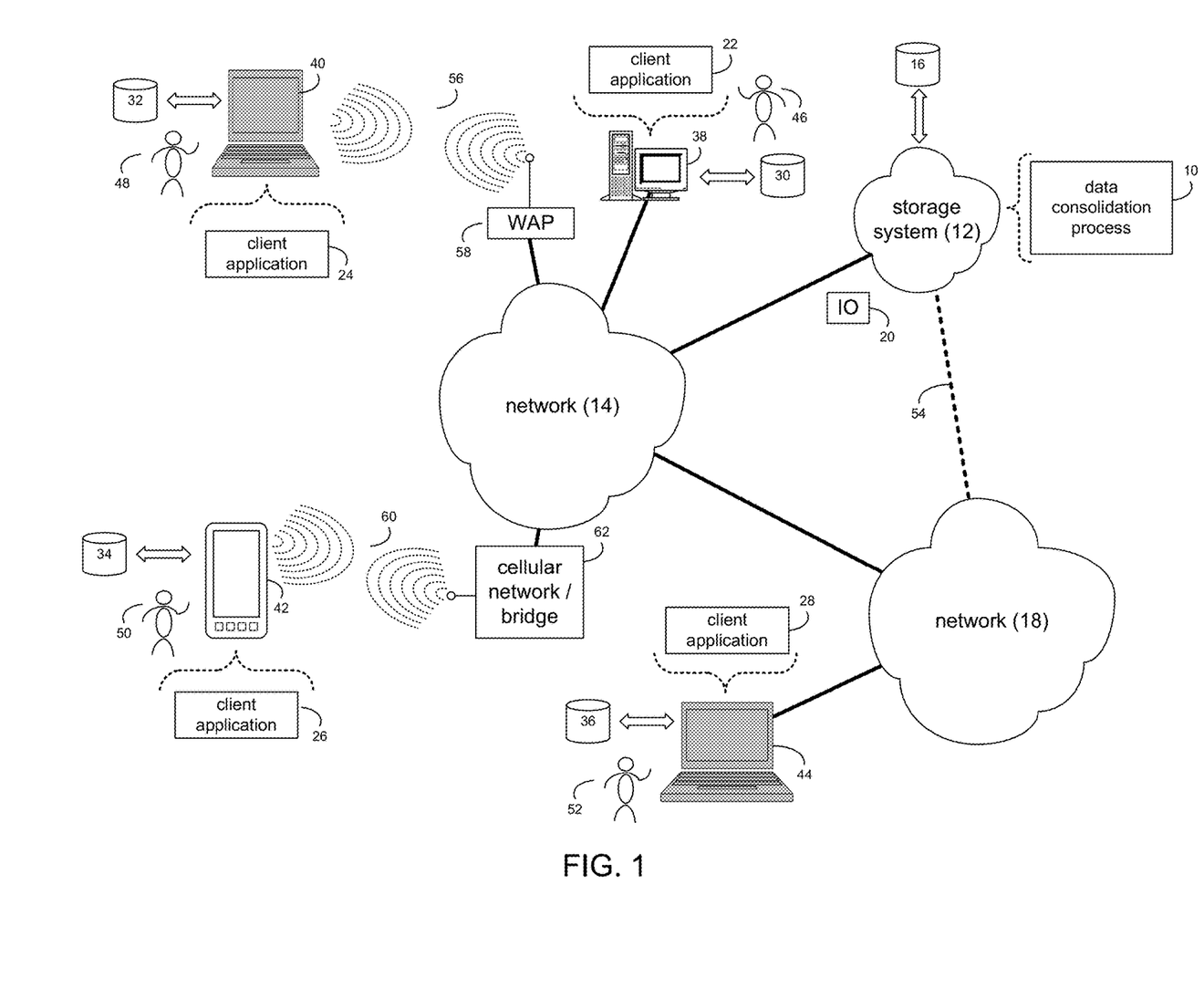
FIG. 1 is an example diagrammatic view of a storage system and a data consolidation process coupled to a distributed computing network according to one or more example implementations of the disclosure.

System Overview:

Referring to FIG. 1, there is shown data consolidation process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of data consolidation process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of data consolidation process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a data consolidation process, such as data consolidation process 10 of FIG. 1, may include but is not limited to, deploying an agent configured to communicate with a centralized database and a plurality of remote databases. The plurality of remote databases may be polled, via the agent, for data for storage in the centralized database. The data may be consolidated from the plurality of remote databases to the centralized database.

For example purposes only, storage system 12 will be described as being a network-based storage system that includes a plurality of electro-mechanical backend storage devices. However, this is for example purposes only and is not intended to be a limitation of this disclosure, as other configurations are possible and considered to be within the scope of this disclosure.

Figure 2:
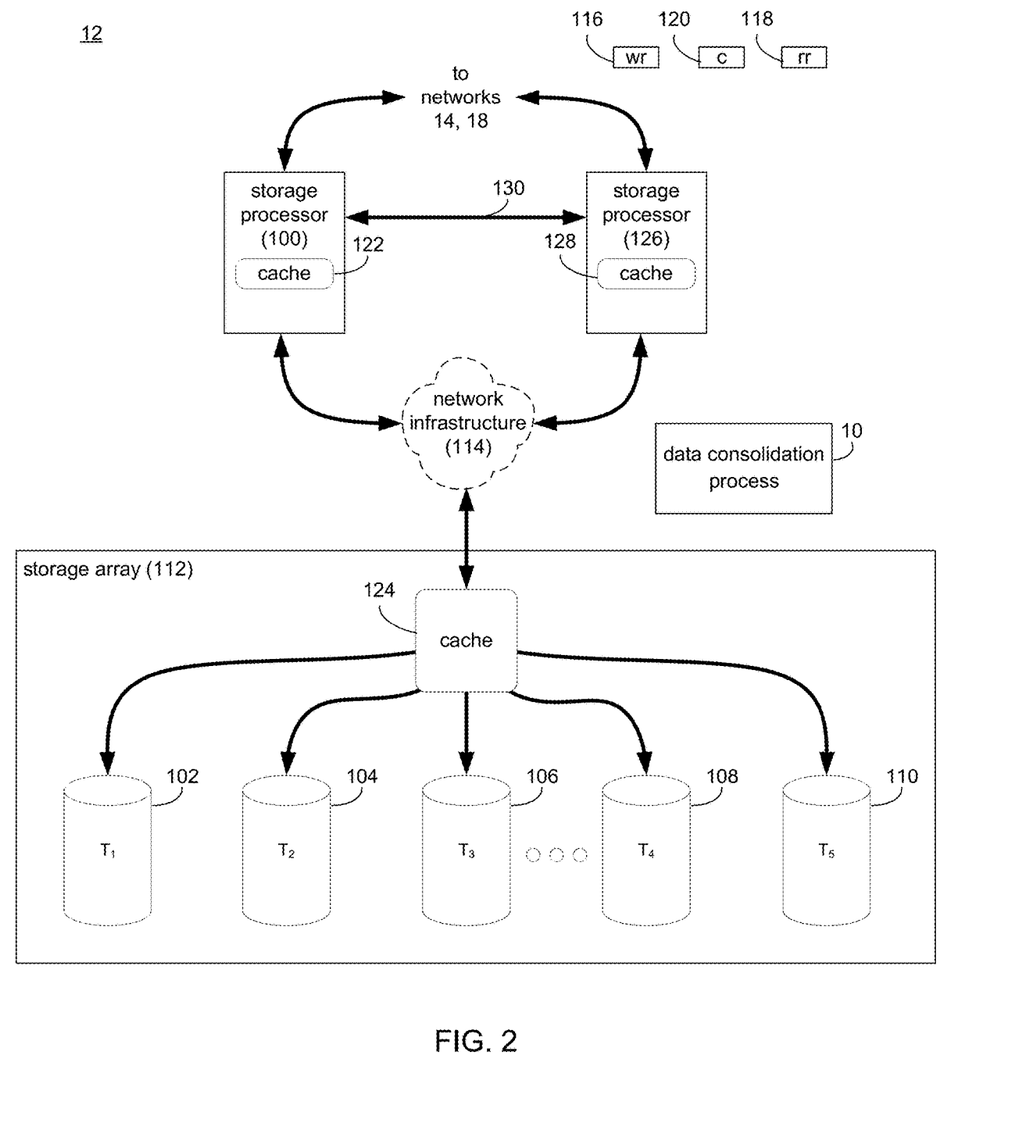
FIG. 2 is an example diagrammatic view of the storage system of FIG. 1 according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of data consolidation process 10. The instruction sets and subroutines of data consolidation process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of data consolidation process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of data consolidation process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of data consolidation process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

In some implementations, storage system 12 may include multi-node active/active storage clusters configured to provide high availability to a user. As is known in the art, the term "high availability" may generally refer to systems or components that are durable and likely to operate continuously without failure for a long time. For example, an active/active storage cluster may be made up of at least two nodes or appliances (e.g., storage processors 100, 126), both actively running the same kind of service(s) simultaneously. One purpose of an active-active cluster may be to achieve load balancing. Load balancing may distribute workloads across all nodes in order to prevent any single node from getting overloaded. Because there are more nodes available to serve, there will also be a marked improvement in throughput and response times. Another purpose of an active-active cluster may be to provide at least one active node in the event that one of the nodes in the active-active cluster fails.

In some implementations, storage processor 126 may function like storage processor 100. For example, during operation of storage processor 126, content 118 to be written to storage system 12 may be processed by storage processor 126. Additionally/alternatively and when storage processor 126 is configured as an application server, content 118 to be written to storage system 12 may be internally generated by storage processor 126.

Storage processor 126 may include frontend cache memory system 128. Examples of frontend cache memory system 128 may include but are not limited to a volatile, solid-state, cache memory system (e.g., a dynamic RAM cache memory system) and/or a non-volatile, solid-state, cache memory system (e.g., a flash-based, cache memory system).

Storage processor 126 may initially store content 118 within frontend cache memory system 126. Depending upon the manner in which frontend cache memory system 128 is configured, storage processor 126 may immediately write content 118 to data array 112 (if frontend cache memory system 128 is configured as a write-through cache) or may subsequently write content 118 to data array 112 (if frontend cache memory system 128 is configured as a write-back cache).

In some implementations, the instruction sets and subroutines of data consolidation process 10, which may be stored on storage device 16 included within storage system 12, may be executed by one or more processors (not shown) and one or more memory architectures (not shown) included within storage system 12. Accordingly, in addition to being executed on storage processor 126, some or all of the instruction sets and subroutines of node fencing 10 may be executed by one or more processors (not shown) and one or more memory architectures (not shown) included within data array 112.

Further and as discussed above, during the operation of data array 112, content (e.g., content 118) to be written to data array 112 may be received from storage processor 126 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

As discussed above, storage processor 100 and storage processor 126 may be configured in an active/active configuration where processing of data by one storage processor may be synchronized to the other storage processor. For example, data may be synchronized between each storage processor via a separate link or connection (e.g., connection 130).

Figure 3:
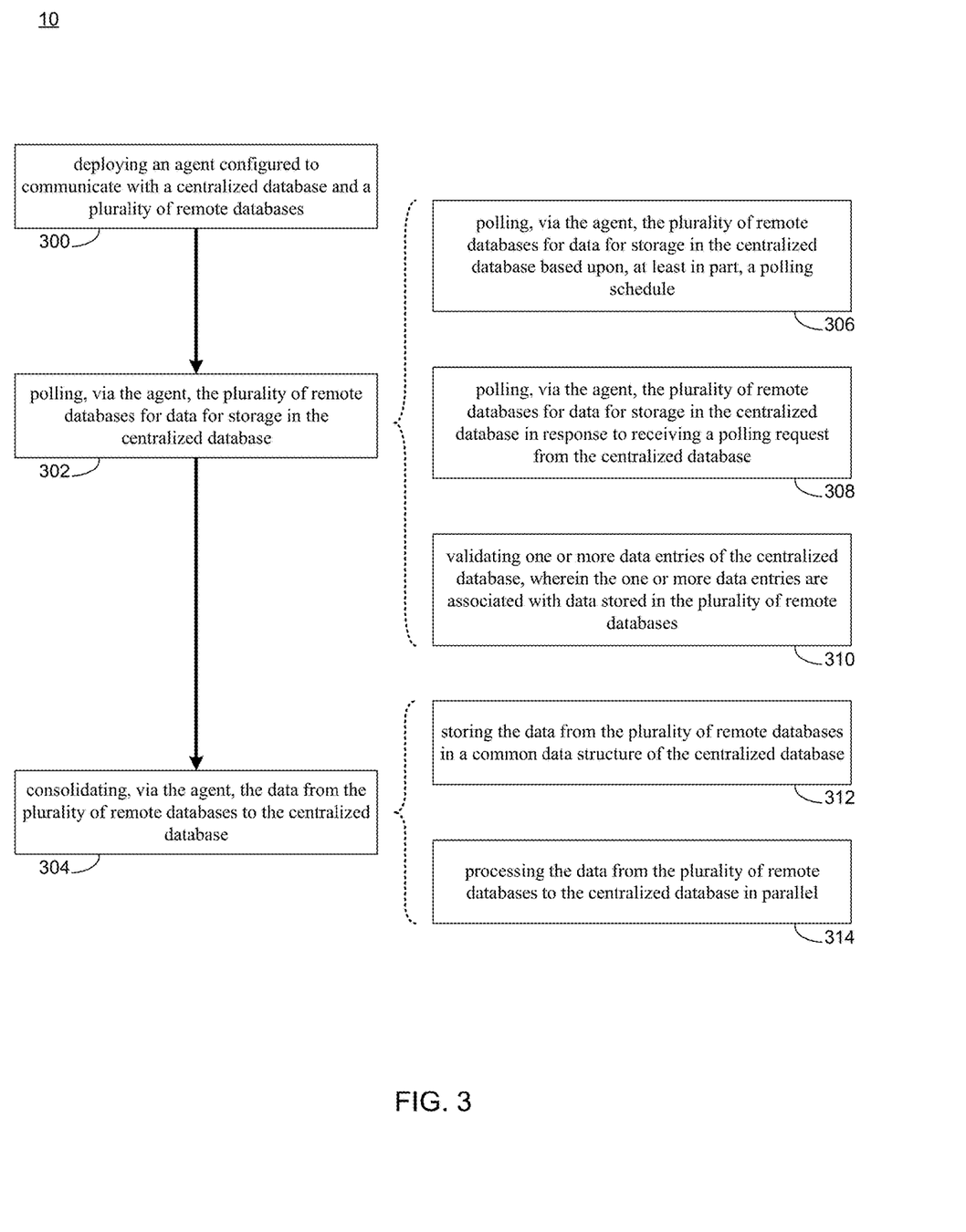
FIG. 3 is an example flowchart of data consolidation process according to one or more example implementations of the disclosure.
Figure 4:
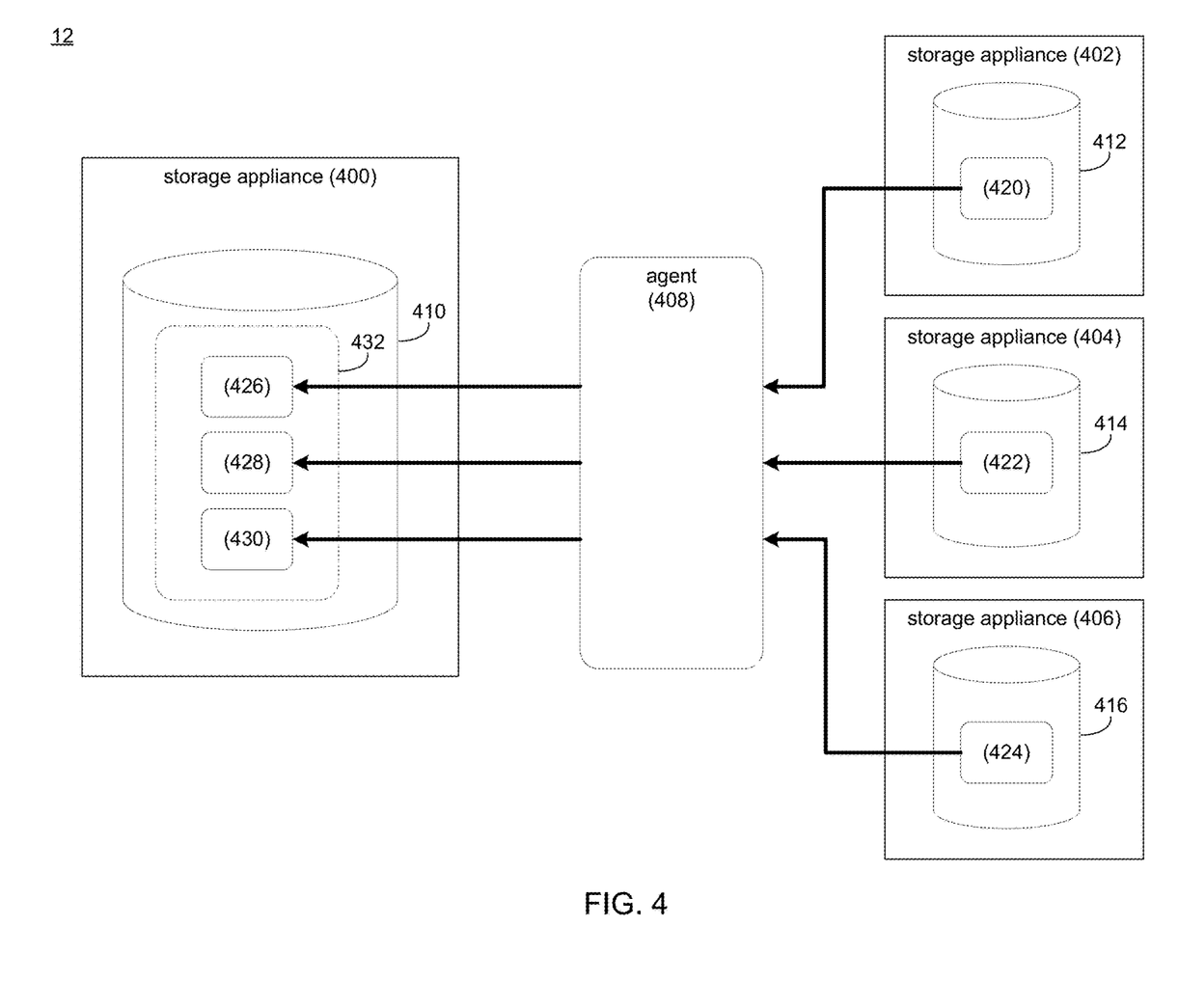
FIGS. 4-5 are example diagrammatic views of the storage system of FIG. 1 according to one or more example implementations of the disclosure.
Figure 5:
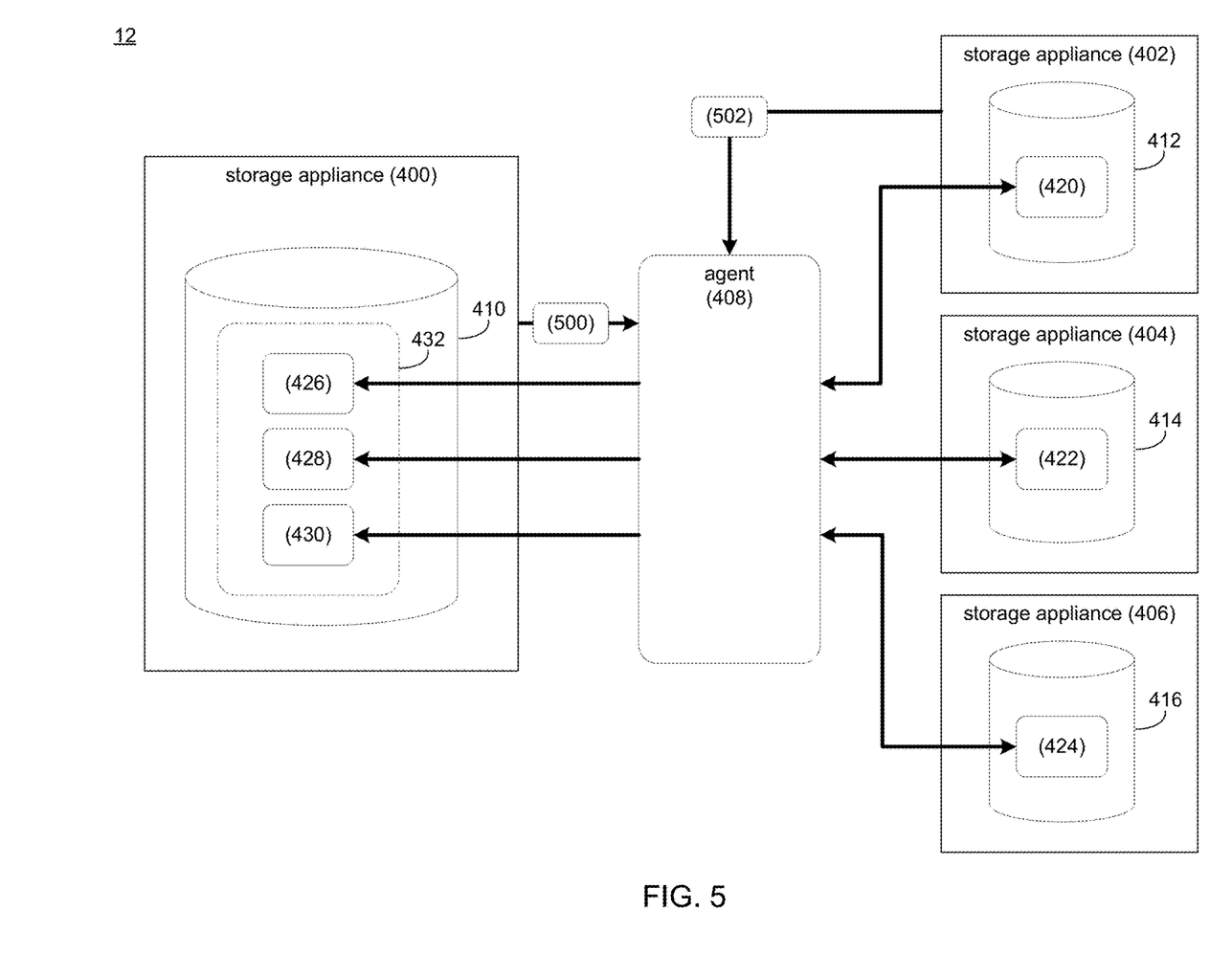

The Data Consolidation Process:

Referring also to the examples of FIGS. 3-5 and in some implementations, data consolidation process 10 may deploy 300 an agent configured to communicate with a centralized database and a plurality of remote databases. The plurality of remote databases may be polled 302, via the agent, for data for storage in the centralized database. The data may be consolidated 304 from the plurality of remote databases to the centralized database.

As will be discussed in greater detail below, implementations of the present disclosure may allow for data transmission from remote sources to a centralized database within a cluster-based configuration to be performed in parallel. For example, and as discussed above, many storage systems utilize a cluster-based configuration for coupling multiple storage appliances where data on one storage appliance is accessible via any of the storage appliances. However, these configurations generally include a primary storage appliance that is configured to process the majority of, if not all, external input/output (IO) commands on the storage system. Accordingly, when data is distributed across the cluster-based configuration, processing IO commands associated with the distributed data may introduce processing delays. Additionally, conventional combined remote data collection and local data processing performance heavily depends on the current processing loads for each storage appliance and introduces challenges for parallel processing.

For example and referring also to FIG. 4, multiple storage appliances (e.g., storage appliances 400, 402, 404, 406), may be deployed in different data centers or server rooms within the same data center, may cooperate to expose a single "metro" virtual volume to application hosts, making those hosts and applications running on them perceive multiple virtual volumes hosted by the storage systems as a single virtual volume. A pair of storage appliances in such a configuration may be referred to as a "metro cluster". Metro cluster configurations may generally be used for increased availability and disaster avoidance; resource balancing across datacenters; and storage migration. In some implementations, metro cluster configurations may be deployed using uniform host connectivity, where a host (e.g., a VMWare ESXi host) located in one datacenter is connected to each storage appliances (with one connection across datacenters). While an example of a metro cluster has been discussed above, it will be appreciated that this is for example purposes only and that any number of storage appliances may be coupled together to form a cluster-based storage system.

In some implementations, data consolidation process 10 may deploy 300 an agent configured to communicate with a centralized database and a plurality of remote databases. Referring again to FIG. 4 and in some implementations, an agent (e.g., agent 408) may generally include a software and/or hardware module configured to transfer data between a centralized database (e.g., centralized database 410) and a plurality of remote databases (e.g., remote databases 412, 414, 416). A centralized database (e.g., centralized database 410) may generally include one or more storage devices configured to store data within a storage appliance (e.g., storage appliance 400).

The plurality of remote databases (e.g., remote databases 412, 414, 416) may include a plurality of separate storage devices and/or separate portions of storage space within a common storage device that are configured to store data within one or more storage appliances (e.g., storage appliances 402, 404, 406). A remote database may generally represent a database separate from the centralized database. In this manner, the remote database may be physically proximate to but separate from the centralized database. Accordingly, it will be appreciated that the term remote imposes no threshold or minimum amount of physical or logical separation from the centralized database. While the example of FIG. 4 includes e.g., three remote databases across three separate storage appliances, it will be appreciated that this is for example purposes only and that any number of remote databases across any number of storage appliances may be utilized within the scope of the present disclosure.

As discussed above and in some implementations, the centralized database may be located on a first storage appliance. Referring again to FIG. 4, the centralized database (e.g., centralized database 410) may be located on a first storage appliance (e.g., storage appliance 400). As discussed above, a cluster-based storage system (e.g., as shown in FIG. 4) may include a plurality of storage appliances (e.g., storage appliances 400, 402, 404, 406) configured to store data in various databases (e.g., centralized database 410 and/or remote databases 412, 414, 416). In some implementations, a first storage appliance (e.g., storage appliance 400) may be a primary storage appliance in the cluster-based configuration (e.g., storage system 12). In this manner, the first storage appliance (e.g., storage appliance 400) may be configured to receive a majority of, or the entirety of, a plurality of IO commands received by the storage system (e.g., storage system 12). Accordingly, the first storage appliance (e.g., storage appliance 400) may be configured to process data to and/or from the plurality of remote databases (e.g., remote databases 412, 414, 416) located within a plurality of remote storage appliances (e.g., storage appliances 402, 404, 406).

The plurality of remote databases may be located on a plurality of storage appliances communicatively coupled to the first storage appliance. For example, and as discussed above, a plurality of storage appliances (e.g., storage appliances 400, 402, 404, 406) may be configured in a cluster-based configuration. The cluster-based configuration may allow for data to be stored across the plurality of storage appliances where data may be replicated and/or distributed across the storage system. As will be discussed in greater detail below, data consolidation process 10 may receive an IO command configured to store or write data within the storage system. Specifically, data consolidation process 10 may "shard" the data across the plurality of remote databases (e.g., remote databases 412, 414, 416) within a plurality of storage appliances (e.g., storage appliances 402, 404, 406) such that a shard or portion of the data may be stored in various storage appliances within the storage system. Sharding the data may allow for more efficient load balancing and/or storage appliance utilization. As will be discussed in greater detail below, data consolidation process 10 may access and process the sharded data from the plurality of remote databases (e.g., remote databases 412, 414, 416) in parallel using the agent (e.g., agent 408).

Deploying 300 the agent (e.g., agent 408) configured to communicate with a centralized database (e.g., centralized database 410) and a plurality of remote databases (e.g., remote databases 412, 414, 416) may include initializing agent 408 upon storage system initialization, on-demand, or at any time in the operation of the storage system (e.g., storage system 12). The agent (e.g., agent 408) may be a software and/or hardware module of the first storage appliance (e.g., storage appliance 400), may be a software and/or hardware module of one of the plurality of remote storage appliances (e.g., remote storage appliances 402, 404, 406), or a software and/or hardware module of a separate computing device coupled to the centralized database (e.g., centralized database 410) and the plurality of remote databases (e.g., remote databases 412, 414, 416). As shown in FIG. 4, agent 408 may deployed 300 to communicate with centralized database 410 and plurality of remote databases 412, 414, 416.

In some implementations, data consolidation process 10 may poll 302, via the agent, the plurality of remote databases for data for storage in the centralized database. Referring again to the example of FIG. 4, data consolidation process 10 may poll, via the agent (e.g., agent 408), the plurality of remote databases (e.g., remote databases 412, 414, 416) for data (e.g., data 420 of remote database 412, data 422 of remote database 414, and data 424 of remote database 416) for storage in the centralized database (e.g., centralized database 410). Polling the plurality of remote databases for data for storage in the centralized database may generally include determining whether there is data from a given remote database to be consolidated for storage in the centralized database. For example, suppose remote database 412 is storing data 420; remote database 414 is storing data 422; and remote database 416 is storing data 424. In this example, data consolidation process 10 may poll 402, via agent 408, remote database 412 for data 420 for storage in centralized database 410; remote database 414 for data 422 for storage in centralized database 410; and remote database 416 for data 424 for storage in centralized database 410.

Polling 302, via the agent, the plurality of remote databases for data for storage in the centralized database may include at least one of: polling, via the agent, the plurality of remote databases for data for storage in the centralized database based upon, at least in part, a polling schedule; and polling, via the agent, the plurality of remote databases for data for storage in the centralized database in response to receiving a polling request from the centralized database. For example, data consolidation process 10 may poll 306, via agent 408, the plurality of remote databases (e.g., remote databases 412, 414, 416) for data based upon, at least in part, a polling schedule. A polling schedule may define when and how often agent 408 polls 306 remote databases 412, 414, 416 for data for storage in centralized database 410. The polling schedule may be automatically defined by data consolidation process 10 (e.g., in response to how often data is polled from the plurality of remote databases, how often data is written to and/or read from the plurality of remote databases, the amount of data is stored in each remote database, etc.). In addition to automatically defining the polling schedule, the polling schedule may be a default polling schedule and/or a user-defined polling schedule (e.g., defined via a user interface).

Data consolidation process 10 may poll 308, via the agent, the plurality of remote databases for data for storage in the centralized database in response to receiving a polling request from the centralized database. Referring also to FIG. 5, the centralized database (e.g., centralized database 410) and/or the first storage appliance (e.g., first storage appliance 400) may generate and send a polling request (e.g., polling request 500) directing the agent (e.g., agent 408) to poll the plurality of remote databases (e.g., remote databases 412, 414, 416) for data for storage in the centralized database (e.g., centralized database 410). The polling request (e.g., polling request 500) may be a one-time directive for the agent (e.g., agent 408) to poll 308 the plurality of remote databases (e.g., remote databases 412, 414, 416) and/or may be a polling schedule that may be updated periodically to direct the agent (e.g., agent 408) to poll 308 the plurality of remote databases (e.g., remote databases 412, 414, 416) according to a predefined schedule.

Data consolidation process 10 may poll, via the agent, the plurality of remote databases for data for storage in the centralized database in response to receiving a polling request from a remote database. Referring again to FIG. 5, a remote database (e.g., remote database 412) and/or a remote storage appliance (e.g., storage appliance 402) may generate and send a polling request (e.g., polling request 502) directing the agent (e.g., agent 408) to poll that particular remote databases (e.g., remote database 412) for data for storage in the centralized database (e.g., centralized database 410). The polling request (e.g., polling request 502) may be a one-time directive for the agent (e.g., agent 408) to poll 308 the remote database (e.g., remote database 412) and/or may be a polling schedule that may be updated periodically to direct the agent (e.g., agent 408) to poll 308 the remote database (e.g., remote database 412) according to a predefined schedule.

In one example, a remote database (e.g., remote database 412) and/or a remote storage appliance (e.g., storage appliance 402) may generate and send a polling request (e.g., polling request 502) to the agent (e.g., agent 408) in response to e.g., reaching a threshold storage capacity, passing a threshold amount of time since the remote database and/or the storage appliance was last polled, storing a threshold amount of new data within the remote database and/or the storage appliance, etc. In this manner, the remote database (e.g., remote database 412) and/or the remote storage appliance (e.g., storage appliance 400) may provide the request (e.g., polling request 402) to the agent (e.g., agent 408) to poll 308 the remote database (e.g., remote database 412) for data to store in the centralized database (e.g., centralized database 410).

Polling 302, via the agent, the plurality of remote databases for data for storage in the centralized database may include validating 310 one or more data entries of the centralized database, wherein the one or more data entries are associated with data stored in the plurality of remote databases. In some implementations, data consolidation process 10 may have previously consolidated 304 data from the plurality of remote databases (e.g., data 420 from remote database 412; data 422 from remote database 414; and data 424 from remote database 416). In this example and as opposed to re-consolidating 304 the data from the plurality of remote databases, data consolidation process 10 may validate 310 one or more data entries of the plurality of remote databases. Validating 310 the one or more data entries of the centralized database may include determining whether the data has changed since the data was consolidated to the centralized database. In this manner, validated data (e.g., data of a remote database that has not changed since being consolidated to the centralized database) may not be re-consolidated; thus, improving storage system performance by forgoing unnecessary processing of the validated data. Alternatively, invalidated data (e.g., data of a remote database that has changed since being consolidated to the centralized database) may be re-consolidated from the remote database such that the most recent version of the data is stored in the centralized database. For example, instead of re-consolidating data 420 from remote database 414, data consolidation process 10 may validate 310, via agent 408, data 426 from centralized database 410.

In some implementations, data consolidation process 10 may consolidate 304, via the agent, the data from the plurality of remote databases to the centralized database. Consolidating 304 may generally include the copying and/or transferring of data from a remote database and/or remote storage appliance to a centralized database. Referring again to the example of FIG. 5, data consolidation process 10 may consolidate 304, via the agent (e.g., agent 408), data from the plurality of remote databases (e.g., data 420 from remote database 412; data 422 from remote database 414; and/or data 424 from remote database 416) for storage in the centralized database (e.g., centralized database 410) (e.g., represented in FIGS. 4-5 as data 426, 428, and 430, respectively). In this example, the agent (e.g., agent 408) may consolidate 304 the data (e.g., data 420 from remote database 412; data 422 from remote database 414; and/or data 424 from remote database 416) by copying and/or transferring the data for storage in the centralized database (e.g., centralized database 410).

Consolidating 304, via the agent, the data from the plurality of remote databases to the centralized database may include storing 312 the data from the plurality of remote databases in a common data structure of the centralized database. Referring again to the example of FIG. 5, data consolidation process 10 may store 312 the data (e.g., data 420, 422, 424) from the plurality of remote databases (e.g., remote databases 412, 414, 416) in a common data structure (e.g., common data structure 432) of the centralized database (e.g., centralized database 410). For example, and unlike conventional cluster-based configurations, the centralized database (e.g., centralized database 410) may store data from the plurality of remote databases within the same or common data structure. A data structure may generally include any storage device or portion of memory of a storage device within a storage appliance. Data consolidation process 10 may consolidate 304 the data (e.g., data 420, 422, 424) from the plurality of remote databases (e.g., remote databases 412, 414, 416) by storing 312 data 426 in one range or portion of the common data structure (e.g., common data structure 432); data 428 in another range or portion of the common data structure (e.g., common data structure 432); and data 430 in yet another range or portion of the common data structure (e.g., common data structure 432).

Consolidating 304, via the agent, the data from the plurality of remote databases to the centralized database may include processing 314 the data from the plurality of remote databases to the centralized database in parallel. For example and in response to polling 302 the plurality of remote databases (e.g., remote databases 412, 414, 416) for data to store or consolidate to the centralized database (e.g., centralized database 410), data consolidation process 10 may consolidate 304 the data from the plurality of remote databases (e.g., data 420 from remote database 412; data 422 from remote database 414; and data 424 from remote database 416) in parallel. That is, data consolidation process 10 may consolidate 304 data 420 from remote database 412; data 422 from remote database 414; and/or data 424 from remote database 416 in parallel. Processing 314 the data (e.g., data 420, 422, 424) in parallel may include processing the data concurrently/substantially concurrently. In this manner, data consolidation process 10 may improve the processing efficiency of the cluster-based storage system. In one example implementation, the time required to consolidate data from remote databases to a centralized database is reduced from e.g., 11.5 seconds to e.g., 2 seconds.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
   sharding a data object across the plurality of remote databases such that a respective portion of the data object is stored in a respective remote database of the plurality of remote databases;
   deploying an agent configured to communicate with a centralized database and a plurality of remote databases, wherein the agent includes a software and/or hardware module configured to transfer the data object between the centralized database and the plurality of remote databases;
   polling, via the agent, the plurality of remote databases for the data object for storage in the centralized database which includes validating one or more data entries of the centralized database, wherein the one or more data entries are associated with the respective portion of the data object stored in the plurality of remote databases; and
   consolidating, via the agent, the data object from the plurality of remote databases to the centralized database by accessing and processing each respective portion of the data object from each remote database of the plurality of remote databases to the centralized database in parallel,
   wherein validating the one or more data entries of the centralized database includes determining whether the data object from the plurality of remote databases has changed since the data object from the plurality of remote databases being consolidated to the centralized database, wherein validated data object being not re-consolidated and invalidated data object being re-consolidated from the plurality of remote databases such that the most recent version of the data object is stored in the centralized database.

2. The computer-implemented method of claim 1, wherein the centralized database is located on a first storage appliance.

3. The computer-implemented method of claim 2, wherein the plurality of remote databases are located on a plurality of storage appliances communicatively coupled to the first storage appliance.

4. The computer-implemented method of claim 1, wherein polling, via the agent, the plurality of remote databases for the data object for storage in the centralized database includes at least one of:
   polling, via the agent, the plurality of remote databases for the data object for storage in the centralized database based upon, at least in part, a polling schedule; and
   polling, via the agent, the plurality of remote databases for the data object for storage in the centralized database in response to receiving a polling request from the centralized database.

5. The computer-implemented method of claim 1, wherein consolidating, via the agent, the data object from the plurality of remote databases to the centralized database includes:
   storing the data object from the plurality of remote databases in a common data structure of the centralized database.

6. A computer program product residing on a non-transitory computer readable medium having a plurality of instructions stored thereon which, when executed by a processor, cause the processor to perform operations comprising:
   sharding a data object across the plurality of remote databases such that a respective portion of the data object is stored in a respective remote database of the plurality of remote databases;
   deploying an agent configured to communicate with a centralized database and a plurality of remote databases, wherein the agent includes a software and/or hardware module configured to transfer the data object between the centralized database and the plurality of remote databases;
   polling, via the agent, the plurality of remote databases for the data object for storage in the centralized database which includes validating one or more data entries of the centralized database, wherein the one or more data entries are associated with the respective portion of the data object stored in the plurality of remote databases; and
   consolidating, via the agent, the data object from the plurality of remote databases to the centralized database by accessing and processing each respective portion of the data object from each remote database of the plurality of remote databases to the centralized database in parallel,
wherein validating the one or more data entries of the centralized database includes determining whether the data object from the plurality of remote databases has changed since the data object from the plurality of remote databases being consolidated to the centralized database, wherein validated data object being not re-consolidated and invalidated data object being re-consolidated from the plurality of remote databases such that the most recent version of the data object is stored in the centralized database.

7. The computer program product of claim 6, wherein the centralized database is located on a first storage appliance.

8. The computer program product of claim 7, wherein the plurality of remote databases are located on a plurality of storage appliances communicatively coupled to the first storage appliance.

9. The computer program product of claim 6, wherein polling, via the agent, the plurality of remote databases for the data object for storage in the centralized database includes at least one of:
    polling, via the agent, the plurality of remote databases for the data object for storage in the centralized database based upon, at least in part, a polling schedule; and
    polling, via the agent, the plurality of remote databases for the data object for storage in the centralized database in response to receiving a polling request from the centralized database.

10. The computer program product of claim 6, wherein consolidating, via the agent, the data object from the plurality of remote databases to the centralized database includes:
    storing the data object from the plurality of remote databases in a common data structure of the centralized database.

11. A computing system comprising:
    a memory; and
    a processor configured to shard a data object across the plurality of remote databases such that a respective portion of the data object is stored in a respective remote database of the plurality of remote databases, wherein the processor is further configured to deploy an agent configured to communicate with a centralized database and a plurality of remote databases, wherein the agent includes a software and/or hardware module configured to transfer the data object between the centralized database and the plurality of remote databases, wherein the processor is further configured to poll, via the agent, the plurality of remote databases for the data object for storage in the centralized database which includes validating one or more data entries of the centralized database, wherein the one or more data entries are associated with the respective portion of the data object stored in the plurality of remote databases, wherein the processor is further configured to consolidate, via the agent, the data object from the plurality of remote databases to the centralized database by accessing and processing each respective portion of the data object from each remote database of the plurality of remote databases to the centralized database in parallel,
wherein validating the one or more data entries of the centralized database includes determining whether the data object from the plurality of remote databases has changed since the data object from the plurality of remote databases being consolidated to the centralized database and wherein validated data object being not re-consolidated and invalidated data object being re-consolidated from the plurality of remote databases such that the most recent version of the data is stored in the centralized database.

12. The computing system of claim 11, wherein the centralized database is located on a first storage appliance.

13. The computing system of claim 12, wherein the plurality of remote databases are located on a plurality of storage appliances communicatively coupled to the first storage appliance.

14. The computing system of claim 11, wherein polling, via the agent, the plurality of remote databases for the data object for storage in the centralized database includes at least one of:
    polling, via the agent, the plurality of remote databases for the data object for storage in the centralized database based upon, at least in part, a polling schedule; and
    polling, via the agent, the plurality of remote databases for the data object for storage in the centralized database in response to receiving a polling request from the centralized database.

15. The computing system of claim 11, wherein consolidating, via the agent, the data object from the plurality of remote databases to the centralized database includes:
    storing the data object from the plurality of remote databases in a common data structure of the centralized database.

* * * * *